United States Patent
Prasad et al.

(10) Patent No.: US 6,695,983 B2
(45) Date of Patent: Feb. 24, 2004

(54) SYNGAS PRODUCTION METHOD UTILIZING AN OXYGEN TRANSPORT MEMBRANE

(75) Inventors: Ravi Prasad, East Amherst, NY (US); Joseph Michael Schwartz, Williamsville, NY (US); Earl T. Robinson, Mentor, OH (US); Christian Friedrich Gottzmann, Clarence, NY (US)

(73) Assignees: Praxair Technology, Inc., Danbury, CT (US); BP Amoco Corp., Danbury, CT (US)

( * ) Notice: Subject to any disclaimer, the term of this patent is extended or adjusted under 35 U.S.C. 154(b) by 291 days.

(21) Appl. No.: 09/840,101

(22) Filed: Apr. 24, 2001

(65) Prior Publication Data

US 2002/0155061 A1 Oct. 24, 2002

(51) Int. Cl.⁷ ................................................. C01B 3/24
(52) U.S. Cl. ...................................................... 252/373
(58) Field of Search ................................ 423/650, 651, 423/652, 653, 654; 252/373

(56) References Cited

U.S. PATENT DOCUMENTS

| | | | |
|---|---|---|---|
| 4,631,182 A | 12/1986 | Tottrup et al. | 423/652 |
| 4,793,904 A | 12/1988 | Mazanec et al. | 204/59 |
| 4,824,658 A | 4/1989 | Karafian et al. | 423/652 |
| 5,160,713 A | * 11/1992 | Mazanec et al. | 423/648.1 |
| 5,252,609 A | 10/1993 | Pinto | 518/703 |
| 5,714,091 A | 2/1998 | Mazanec et al. | 252/373 |
| 5,980,840 A | * 11/1999 | Kleefisch et al. | 422/211 |
| 6,048,472 A | 4/2000 | Nataraj et al. | 252/373 |
| 6,066,307 A | * 5/2000 | Keskar et al. | 423/651 |
| 6,077,323 A | 6/2000 | Nataraj et al. | 48/198.1 |
| 6,110,979 A | * 8/2000 | Nataraj et al. | 252/373 |
| 6,114,400 A | * 9/2000 | Nataraj et al. | 252/373 |
| 6,153,163 A | * 11/2000 | Prasad et al. | 423/651 |
| 6,214,066 B1 | * 4/2001 | Nataraj et al. | 423/651 |

OTHER PUBLICATIONS

Prasad et al, Patent Application Publication US 2002/0078906, Jun. 27, 2002.*

* cited by examiner

Primary Examiner—Wayne A. Langel
(74) Attorney, Agent, or Firm—David M. Rosenblum

(57) ABSTRACT

A method of producing a crude syngas product stream or a syngas product stream by further processing of the crude syngas product stream. Both the crude and syngas product stream comprise carbon monoxide and hydrogen. The crude syngas product stream additionally comprises carbon dioxide and moisture. In accordance with the method, methane in a feed stream is converted into the hydrogen and carbon monoxide in at least two stages, thereby to form a crude syngas stream. An initial stage has an oxygen transport membrane reactor having a catalyst to promote carbon dioxide or steam methane reforming. Since, the conversion is shared between two stages, the oxygen transport membrane reactor can be operated at a sufficiently low temperature to avoid ceramic membrane deterioration due to creep effect. The subsequent stage can be operated at a higher temperature with more favorable equilibrium conditions to complete the conversion of the methane.

18 Claims, 2 Drawing Sheets

SYNGAS PRODUCTION METHOD UTILIZING AN OXYGEN TRANSPORT MEMBRANE

FIELD OF THE INVENTION

The present invention relates to a method of producing syngas by converting methane and other hydrocarbons in a gas feed into hydrogen and carbon monoxide. More particularly, the present invention relates to such a method in which the methane is converted in two or more stages to allow an initial catalytic reforming stage formed by an oxygen transport membrane reactor to be operated at a lower temperature than a subsequent stage to protect the structural integrity of the membrane.

BACKGROUND OF THE INVENTION

The use of oxygen transport membranes in high temperature catalytic reactors for the generation of syngas has received significant attention in the recent past because of the economic incentives created by combining oxygen separation and the syngas generating oxidation and reforming reactions in a single process unit. The process involves bringing a mixture of hydrocarbons, steam, and optionally carbon dioxide in contact with the anode side of an electron and oxygen ion conducting ceramic membrane which at high temperature permeates oxygen from an oxygen containing gas, typically air, on the cathode side to the anode. The preferred membranes consist of mixed conducting metal oxide films supported by multi-layer porous structures which near the membrane film enhance surface exchange and are mechanically and chemically compatible. The permeated oxygen will react with the fuel gas in a partial oxidation reaction, which provides the energy for a simultaneous catalytically enhanced reforming reaction to produce a mixture of hydrogen and carbon monoxide, i.e. syngas.

The partial oxidation reaction for methane is shown in Equation 1. The steam reforming reaction for methane is shown in Equation 2. Additional conversion of carbon monoxide may occur with the exothermic water gas shift reaction, Equation 3. The scope of the present invention also includes reforming reactions between methane and $CO_2$ as indicated by equation (4).

$$CH_4 + \tfrac{1}{2}O_2 \rightarrow CO + 2H_2 \qquad (1)$$

$$CH_4 + H_2O \rightarrow CO + 3H_2 \qquad (2)$$

$$CO + H_2O \rightarrow CO_2 + H_2 \qquad (3)$$

$$CH_4 + CO_2 \rightarrow 2CO + 2H_2 \qquad (4)$$

U.S. Pat. No. 4,793,904 describes an electrocatalytic process for producing synthesis gas from light hydrocarbons. The process involves passing an oxygen containing gas over the cathode side of an oxygen ion conducting membrane and permeating oxygen from the cathode to the anode to react with light hydrocarbons and thus producing a synthesis gas. U.S. Pat. No. 5,714,091 discloses a process for generating syngas using an autothermal reactor comprising an oxygen ion conducting membrane. The process stages a partial oxidation reaction with a catalytic reforming reaction where heat is transferred from the former to the latter.

Typically the syngas is produced at high pressure (10 to 40 bar) to avoid cost associated with compressing the low density syngas. To achieve high conversion of methane at the desired hydrogen to carbon monoxide ratios requires favorable equilibrium conditions for the reactant gases which at the prevailing pressures can be obtained only at relatively high temperatures, e.g. 900 to 1100° C. Unfortunately, at these temperatures the preferred membrane materials have low creep strength which leads to limited membrane life and/or complicated structural supports. The problem is further aggravated by the fact that the actual temperatures experienced by the membrane are even higher since a temperature gradient is needed to dissipate the heat of the exothermic oxidation reaction, occurring at or near the anode surface, to the endothermic reforming reaction in the adjacent catalyst structure.

Another problem relates to solid carbon formation, which can be especially acute when the feed stock contains hydrocarbons heavier than methane and it is desired to operate at low steam to carbon ratios. Even with only moderate amounts of hydrocarbons with more than one carbon atom in the natural gas feed, and at the low steam to carbon ratios (<1) desired for processes producing syngas with hydrogen to carbon monoxide ratios of about two or less, permissible inlet temperatures for the reactor, i.e. values above which free carbon formation would occur, would be below the level where appreciable oxygen ion transport rates can be realized. U.S. Pat. No. 6,077,323 addresses syngas generation using mixed conducting ceramic membranes. It discloses operating temperatures for the membrane reactor which avoid solid carbon formation and specifies a higher total pressure on the anode than on the cathode side. Beyond the use of a preformer the patent does not involve a staged process to optimize operation of the membrane reactor-reformer or limit operating temperatures of the membrane. U.S. Pat. No. 6,048,472 by Nataraj et al. stages a catalytic preformer, operating at a lower temperature, ahead of the membrane reactor to eliminate carbon formation, especially with higher hydrocarbons, and raise the permissible inlet temperature for the membrane react. It is to be noted that the prior art routinely employs preformers in conjunction with conventional autothermal or externally fired reformers to eliminate solid carbon formation with heavier feed stocks and or at low steam to carbon ratios. Representative patents illustrating the use of preformers in conjunction with autothermal and conventional steam reformers are U.S. Pat. Nos. 5,252,609, 4,631,182 and 4,824,658.

As will be discussed, the present invention presents a multi-stage processes for syngas generation by oxygen transport membrane reactors that include preformers or catalytic partial oxidation reactors for pretreatment of the hydrocarbon feed streams and oxygen transport membrane reactor-reformers coupled with subsequent reforming or autothermal reforming reactors to allow the oxygen transport membrane reactor-reformers to operate at sufficiently low temperatures to address structural problems with preferred oxygen transport membrane materials.

SUMMARY OF THE INVENTION

The present invention provides a method of producing a crude syngas product stream or a syngas product stream by further processing of the crude syngas product stream. Both the crude and syngas product stream comprise carbon monoxide and hydrogen. The crude syngas product stream additionally comprises carbon dioxide and moisture. In accordance with the method, methane in a feed stream comprising methane is converted into the hydrogen and carbon monoxide in at least two stages, thereby to form a crude syngas stream. The methane is converted at least in part by carbon dioxide or steam methane reforming in one of the at least two stages operated at a lower temperature than a subsequent of the at least two stages. The one of the at least two stages has at least one oxygen transport membrane to separate oxygen from an oxygen containing gas, thereby permeating oxygen from a cathode to an anode side thereof, and a reforming catalyst located adjacent said anode side of the at least one oxygen transport membrane to promote the reforming of the methane. The reforming of the methane is thermally balanced through heat generated by oxidation of fuel species supported by the oxygen permeating through said at least one oxygen transport membrane. The subsequent of the at least two stages can be a fired reformer or an autothermal reformer, sometimes also called an oxygen blown reformer. In case of the formation of a syngas product stream, water and at least part of the carbon dioxide is removed from said crude syngas stream. In certain downstream processes it is advantageous to leave some of the carbon dioxide in the syngas product stream. Part of said syngas product stream can be recycled to form part of the feed stream as can be off-gases from downstream synthesis reactions.

Preferably, the methane in the feed stream can be converted into the hydrogen and carbon monoxide by partial oxidation of the methane prior to the reforming of the methane within an entrant section of the at least one oxygen transport membrane not containing said reforming catalyst. Higher order hydrocarbons within said feed can be converted into a portion of the methane to be converted into said hydrogen and carbon monoxide prior to the partial oxidation of the methane. Such conversion can take place through catalytic partial oxidation or through steam methane reforming. Since part of the methane content of the feed is so converted to syngas, such prereforming or catalytic partial oxidation is considered a further stage of the two stages mentioned above. Sulfur can be removed from the feed prior to the conversion of said higher order hydrocarbons.

The present invention allows for a solution of the problem posed by mechanical limitations of preferred membrane materials by the use of a two stage process in which an oxygen transport membrane reactor forms a first lower temperature stage and an autothermal reactor or externally fired reformer, operating at a higher temperature, forms a high temperature second stage. In this regard, a preferred operating temperature range of the lower temperature stage formed by the membrane reactor is between about 800° C. and about 850° C. At such a temperature range and at a desired process gas pressure of between about 7 bar and about 30 bar, prevailing equilibrium conditions lead to the conversion of only about 75 to 90 percent of the hydrocarbons contained in the membrane reactor feed. The remaining hydrocarbons are converted in the second stage that does not use a ceramic membrane and which operates at a higher temperature to produce more favorable equilibrium conditions. Preferably the second stage reactor is an autothermal device consisting of a combustion section and a catalytic reforming section. The overall reaction in the autothermal unit is exothermic which permits raising the outlet temperature from the second stage to the desired level of between about 950° C. and about 1100° C. Optionally steam and or carbon dioxide can be added to the oxygen feed to adjust the hydrogen to carbon ratio in the synthesis gas product, to control the exothermicity of the process, and to produce more favorable equilibrium conditions. Steam and carbon dioxide can also be added to the feed of the alternate fired reformer stage.

The problem of avoiding solid carbon formation is solved in the present invention by insertion of a catalytic prereforming or partial oxidation step and operating the first section of the oxygen transport membrane reactor as a partial oxidation unit by omitting reforming catalyst in the entrant section thereof. The reaction of the feed with permeated oxygen generates additional hydrogen that contributes to avoiding conditions favorable to solid carbon formation. With respect to carbon formation, preferably a method in accordance with the present invention is conducted such that the inlet temperature of the oxygen transport membrane reactor is not greater than about 750° C. and preferably within a range of between about 700° C. and about 750° C. As has been mentioned above, the prior art addressed the problem of solid carbon formation by inserting a catalytic reformer, operating at temperatures from between about 450° C. to about 550° C., to convert the heavier hydrocarbons and generate some beneficial hydrogen to suppress carbon formation. A catalytic reformer could be used over the same temperature range in connection with the present invention. The catalytic partial oxidation alternative of the present invention preferably operates in a temperature range of between about 400° C. and about 700° C. with an oxidant of high purity oxygen to avoid contaminating the product gas with excessive amounts of inerts. Such a partial oxidation step contributes a portion of the preheating requirements for the feed stock.

BRIEF DESCRIPTION OF THE DRAWINGS

While the specification concludes with claims distinctly pointing out the subject matter that Applicants regards as their invention, it is believed the invention will be better understood when taken in connection of the accompanying drawings in which:

In order to avoid needless repetition in explaining the various features of FIGS. 1 and 2, elements having the same function and description are also provided with the same reference numbers.

DETAILED DESCRIPTION

Figure 1:
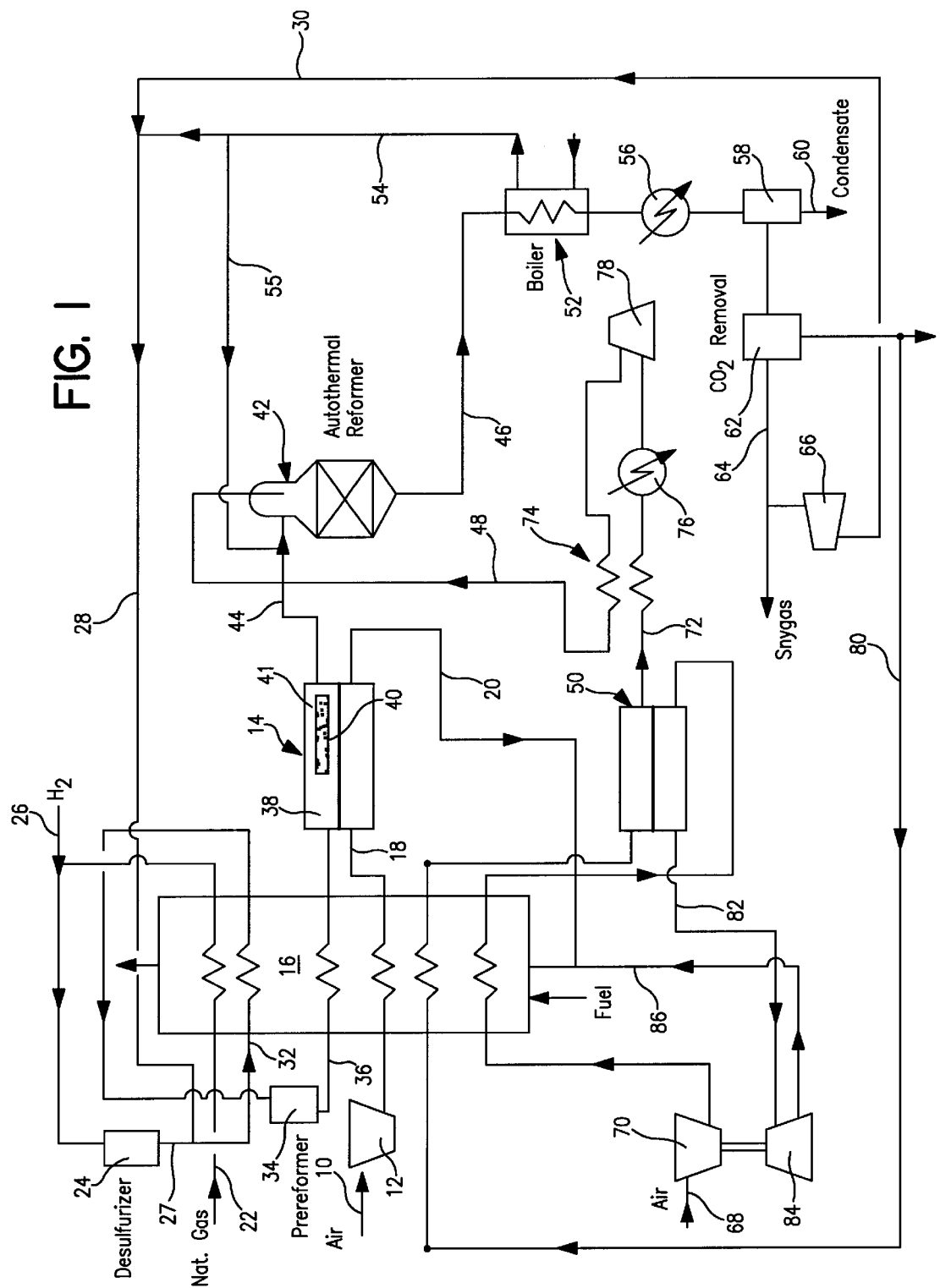
FIG. 1 is a schematic illustration of a multi-stage syngas production method in accordance with the present invention.

FIG. 1 illustrates a Syngas generation process in accordance with the present invention that employs an adiabatic prereformer, a two stage oxygen transport membrane reactor-reformer and an autothermal reformer.

An air stream 10 is compressed to a moderate pressure of 2 to 3 bar by a compressor 12 and then heated to an operational temperature of an oxygen transport membrane reactor unit 14 by recuperative heat exchange with hot oxygen depleted gases and by externally fired heaters within heat exchanger-fired heater 16 as illustrated. Inline combustors are a possible alternative. The heated air stream 18, at a temperature of between about 750° C. and about 850° C., is introduced to the cathode side of oxygen transport membrane reactor unit 14 where some or preferably most of the contained oxygen is transferred to the anode side thereof to react with process gases. The driving force for oxygen permeation is the ratio of partial oxygen pressures at the cathode and anode side of the membrane. Since oxygen is consumed by the anode-side reactions, the partial oxygen pressure at that side will be very low and the ratio of partial oxygen pressures very high, thereby permitting transport of oxygen from a low total pressure on the cathode to a high total pressure on the anode side.

The oxygen permeation within oxygen transport membrane reactor unit 14 produces an oxygen depleted retentate stream 20 containing between about 3% and about 10% oxygen. Oxygen depleted retentate stream 20 is discharged through the heat exchanger-fired heater 16 where it transfers sensible heat to entering gases and where the contained residual oxygen supports combustion of fuel to the extent required for raising incoming cold streams to the desired temperature. It is obvious to those skilled in the art that many alternate arrangements can be employed for heating feed gases and recovering heat from hot gas streams. A feed stream 22 made up of natural gas or alternate light hydrocarbon gas and thus, containing methane, enters the process at pressure, typically between about 7 bar and about 40 bar. Natural gas compositions can vary widely. A typical natural gas composition is 92.1% $CH_4$, 3.8% $C_2H_6$, 1% $C_3H_8$, 0.3% iso $C_4H_{10}$, 0.3% n-$C_4H_{10}$, 1% n-$C_5H_{12}$, 0.2% $C_6H_{14}$+, 0.9% $N_2$, 0.2% $O_2$, 1.1% $CO_2$ plus trace quantities of other hydrocarbons and inert gases, such as Ar and He. Many natural gas feeds also contain Hydrogen Sulfide in the 10 to 1000 parts per-million range and sometimes also organic sulfur compounds. Desulfurization to very low levels of sulfur content is required since sulfur will poison the catalysts in downstream reactors. If organic sulfur compounds are present they are converted to hydrogen sulfide by hydrodesulfurization which is accomplished by mixing the feed gas with recycle hydrogen and passing it over a bed of cobalt or nickel molybdate catalyst at about 300° C. Subsequently the gases are passed over a zinc oxide bed which removes hydrogen sulfide typically to very low levels. In FIG. 1 feed stream 22 is heated to an intermediate temperature of about 300° C. within heat exchanger-fired heater 16 and desulfurized within known desulfurization unit 24, consisting of one or several zink oxide reactor stages. The resultant stream 27, having a sulfur content as low as 30 ppb, is mixed with a stream 28 made up of steam and an optional recycle syngas stream 30 (to be described hereinafter) to form a stream 32 having a desired steam to carbon ratio for generation of syngas suitable for synthesis to methanol, DME, and Fischer-Tropsch liquids, typically between about 0.6 and about 1,5. (The ratio will be higher if the desired end product is hydrogen.) Stream 32 is heated to between about 450° C. and about 550° C. within heat exchanger-fired heater 16 and passed through an adiabatic preformer 34 such as shown in U.S. Pat. No. 5,252,609 to convert heavier hydrocarbons, that is hydrocarbons having a higher carbon and hydrogen content than methane, to methane, to carbon monoxide and hydrogen.

As mentioned above, such preforming inhibits carbon formation in subsequent higher temperature reforming stages that form the syngas product. As can be appreciated, such preforming might not be necessary for feeds having a sufficiently low content of higher order hydrocarbons.

Since, in the illustrated process, adiabatic preforming is endothermic, the gas will experience a drop in temperature across the preformer. Therefore the resultant methane containing stream 36 is heated to a near membrane operating temperature of oxygen transport membrane reactor unit 14 within heat exchanger-fired heater 16. Methane containing stream 36 enters the anode side of oxygen transport membrane reactor unit 14 below a temperature at which solid carbon formation would be experienced (typically about 750° C.). As shown in the Figure, the anode side of oxygen transport membrane reactor unit 14 has a first section 38 which contains no catalyst. Process gases contained within methane containing stream 36 react with the permeated oxygen predominantly in a partial oxidation reaction because of the absence of reforming catalyst. Since the reaction is exothermic, the temperatures of the process retentate and permeate side gases increase. Beyond the point where the temperature of the resident gases reaches about 800 to 850° C. a catalyst 40 is installed within a second section 41 of the anode side of oxygen transport membrane reactor unit 14. It is to be noted that first section 38 of oxygen transport membrane reactor unit 14 could be deleted in a proper embodiment of the present invention. However, in such an embodiment, it would become more difficult to sufficiently heat the feed to the catalyst to conduct the reforming of the feed.

In second section 41 permeated oxygen will now react with the process gases in a combination partial oxidation-reforming reaction in which the exothermic heat released by the oxidation reactions balances the endothermic heat consumed by the reforming reactions. The reforming reaction is promoted by catalyst 40 which is either contained in the porous support of the membrane or in a catalyst bed adjacent to the membrane. To maintain the overall and local heat balances along the bed at a level which prevents excessive temperature rise of the transiting gases, control is exercised by adjusting local catalyst activity, gas composition, and oxidant supply.

Because of the combination of high pressure and low temperature, equilibrium conditions will prevent completion of methane conversion within section 41 of oxygen transport membrane reactor unit 14. Depending upon the pressure level, between about 10 and about 25 percent of the methane contained in the feed will not be converted. Therefore a second subsequent stage is added in the form of an autothermal reactor or oxygen blown reformer 42 containing a combustion section and a catalytic reforming section, such as described in The Encyclopedia of Chemical Processing and Design, Vol 56, p. 215 ff. Marcel Dekker, Inc., New York, Basel, Hong Kong, 1996, where the residual of the methane contained in the gas stream 44 exiting the oxygen transport membrane reactor unit 14 is converted into a crude syngas stream 46 containing typically hydrogen and carbon monoxide at a ratio of about 2 to 1 and carbon dioxide and water. Additional steam 55 or carbon dioxide can be added to the autothermal reactor feed, as required to control the exothermicity of the process and the hydrogen to carbon monoxide ratio in the syngas product at the desired level. In FIG. 1 carbon dioxide is used as purge gas stream 80 for the anode of OTM separator 50 and enters reactor 52 with the oxygen stream 48. The overall reaction in the autothermal reactor 42 is exothermic so that raw syngas stream 46 leaving the autothermal reactor 42 is at a temperature between about 1000° C. and about 1100° C. At these temperatures nearly complete conversion of methane is achieved. An oxidant stream 48 is injected into the autothermal reactor 42 is high purity oxygen (greater than about 90% by volume oxygen or containing less than 10 percent of inert gases such as nitrogen and argon), which in the case at hand is supplied by an integrated oxygen transport membrane separator 50. As may be appreciated, the required oxygen can alternately be produced by an independent onsite oxygen plant such as a cryogenic distillation plant, or a vacuum pressure swing adsorption plant.

The composition of the raw syngas stream 46 is conducive to dusting of metal surfaces in downstream heat transfer equipment unless these surfaces are maintained at a temperature above about 700° C. or below about 400° C. Synthesis gas contains a high percentage of carbon monoxide which is known to attack certain metal alloys in the temperature range of about 400° C. and about 700° C. in a phenomenon called metal dusting. This problem is especially acute in cooling synthesis gas which has a high carbon monoxide content. Metal dusting is a catastrophic carbonization of the alloy resulting in the formation of internal carbides that create pitting and thinning of metal structures in relatively short periods of time. Avoiding metal dusting requires either to keep metallic surfaces such as heat exchanger walls at temperatures outside the critical range, e.g. by having boiling water on one side of the wall, cooling a syngas product stream by quenching with water, thereby eliminating the need for heat exchangers in the critical temperature range, or by using a metal that resists metal dusting. One of the more resistant alloys to metal dusting is known to be HAYNES® 230 alloy, a nickel-chromium-tungsten molybdenum alloy. However, such special resistant alloys are expensive and greatly increase the cost of the reactor. In the Figure, metal dusting is avoided by cooling the process gas against boiling water in a boiler 52. The high heat transfer coefficients on the waterside (in comparison to those on the process side) assure that the walls will not exceed the critical temperature. Boiler 52 produces a stream 54 composed of steam which in part can be combined with recycle stream 30 and also, in part, serves to form stream 55.

After leaving boiler 52 the water contained in raw syngas stream is condensed in a condenser 56 and removed in a separator 58 as a process condensate stream 60. The process condensate can be recycled to the process as boiler feed water after treatment. Since the crude syngas stream 46 is typically at elevated pressure the heat of condensation can be rejected against boiling water and condenser 56 can be a waste heat boiler. The low pressure steam generated by the waste heat boiler can be used as an optional purge gas for the OTM membrane anode. In that case the steam contained in the permeate stream from the separator is condensed and separated before oxygen compression. Following this step at least part of the contained carbon dioxide is removed in a known acid gas removal unit 62, which can be a well known liquid wash system in which acid gases are stripped or absorbed by an amine wash, leaving the final syngas product stream 64 for delivery to a downstream process. For instance, a downstream process might be a Fischer-Tropsch reactor. A portion as a recycle stream 30 (described above) of the syngas product stream 64 may be recycled to the feed of the prereformer feed 34 via a recycle compressor 66.

As mentioned above an oxidant stream 48, which is injected into the autothermal reformer 42, is produced by an integrated oxygen transport membrane separator 50. An air stream 68 for this separator is compressed by a second air compressor 70 to a pressure in excess of about 5 bar and heated to a membrane operating temperature of at least 700° C. in heat exchanger-fired heater 16. Thereafter, air stream 68 is introduced to the cathode side of oxygen transport membrane separator 50, where oxygen is separated and transferred to the anode by ion transport, driven by the difference in partial oxygen pressures between the anode and cathode side. Preferentially at least about 50 percent and more preferably at least about 75 percent of the contained oxygen is recovered at the anode side of oxygen ion transport membrane separator 60. The resultant permeate stream 72 is cooled to near ambient temperature in a recuperative heat exchanger 74 and then in a water or air cooled exchanger 76. Subsequently, permeate stream 72 is compressed to the required process pressure by an oxygen compressor 78 and heated in recuperative heat exchanger 74 against hot low pressure permeate stream 72 to form oxidant stream 48 for injection into autothermal reactor 42.

If the addition of carbon dioxide or steam to the feed to autothermal reactor 42 is desirable, either of these gases can be used as a sweep gas for the anode of the oxygen transport membrane separator 50. Thereby the partial oxygen pressure on the permeate side can be lowered which permits either attaining higher oxygen recovery or reducing the pressure of the air feed on the cathode side. As illustrated, a carbon dioxide stream 80 separated from raw syngas stream 46 is used for such purposes. The hot retentate stream 82 from oxygen transport membrane separator 50 is expanded in a turbine 84 which also drives air compressor 70 and potentially also the oxygen compressor 78 and then as a stream 86 joins oxygen depleted retentate stream 20 where its residual oxygen provides additional oxidant for combustion in heat exchanger-fired heater 16.

It should be noted that expansion turbine 84 can have more than one expansion stage with reheat between stages to produce additional power. In an alternate option oxygen transport membrane separator 50 can be integrated with a waste heat powered Rankine steam cycle. In that case the exhaust from the steam turbine, that drives resident compressors can be used as a sweep gas for the anode side of the oxygen transport membrane separator 50.

Figure 2:
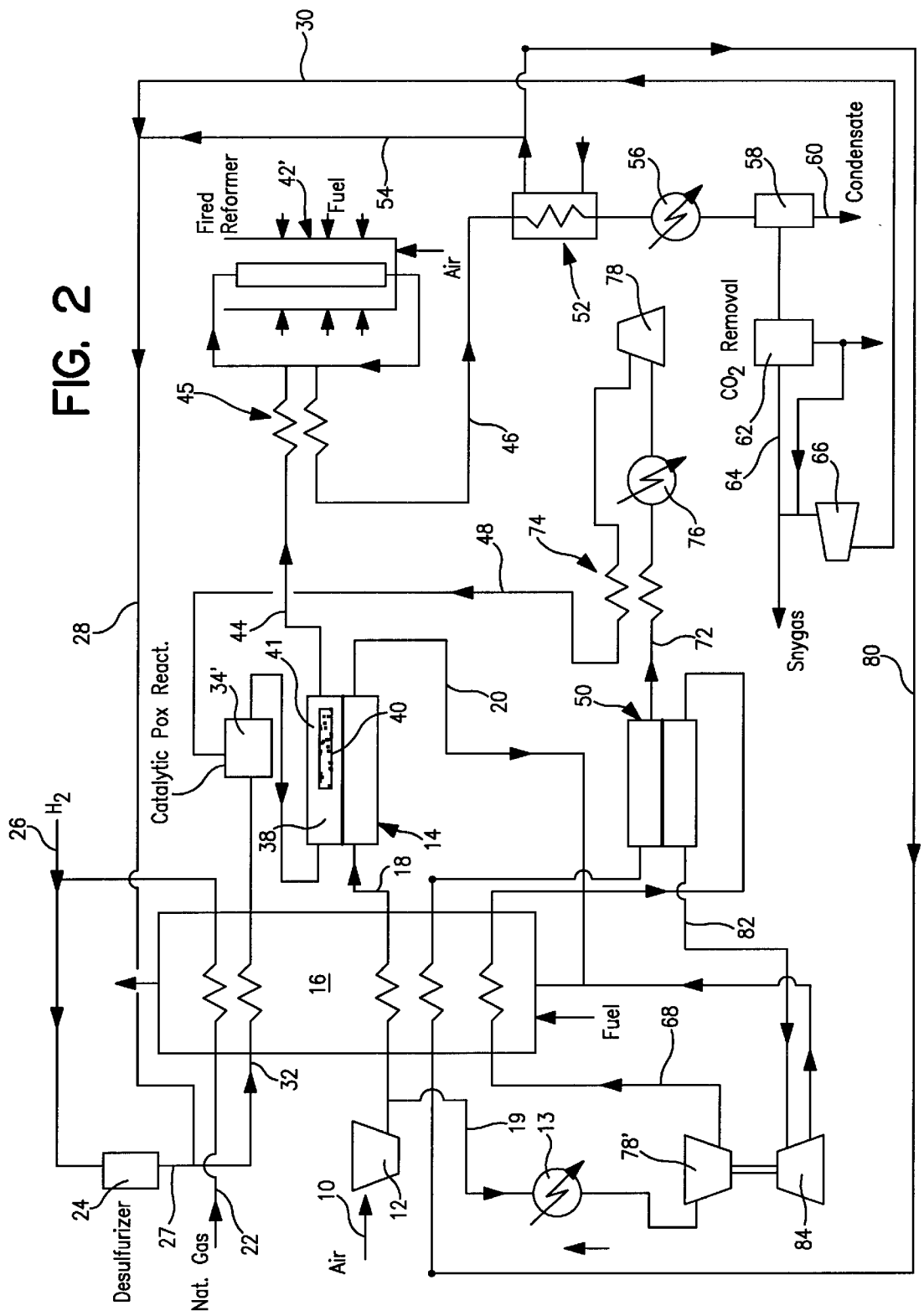
FIG. 2 is a schematic illustration of an alternative embodiment of a multi-stage syngas production method in accordance with the present invention.

With reference to FIG. 2, a multistage method of producing syngas is illustrated in which a catalytic partial oxidation unit 34' is used for feed pretreatment and a final fired reformer 42' stage is used to assure nearly complete conversion of hydrocarbons contained in feed stream 22.

After the optional addition of hydrogen stream 26 to feed stream 22, the combined stream is desulfurized in desulfurization unit 24. The resultant stream 27 is mixed with stream 28 made up of steam and optional recycle syngas stream 30 to form stream 32. Preferably steam is added at a rate, which results in a steam to carbon ratio of less than 1 for syngas product with a hydrogen to carbon monoxide ratio of about 2 to 1 or less. Stream 32 is then heated within heat exchanger-fired heater 16 to a temperature of between about 450° C. and about 550° C. and introduced along with oxidant stream 48 into a catalytic partial oxidation unit 34'. It is to be noted that oxidant stream 48 is made-up, at least in part, by oxygen separated from air stream 68 produced from a portion 19 of air stream 10, cooled by an after-cooler 13 and then compressed by a booster compressor 68.

Suitable catalysts for catalytic partial oxidation unit 34' include pure metals, such as Pt, Pd, Co, Ni, Ir, Re, and Ru. Other suitable catalysts include compounds of the general formula $M_2Ru_2O_7$, wherein M is a rare earth metal such as Pr, Sm, Eu or Gd. The more preferred catalysts are pure Rh, Ni, and Pt, typically on an alumina support that is stabilized with rare earth oxide. Most preferred is Pt since it produces a yield of partial oxidation products nearly as high as that produced by Ni or Rh, is less likely than Ni in producing undesirable amounts of carbon byproducts and is less expensive than Rh.

In general it is desirable to limit the flow of oxygen contained within oxidant stream 48 to a value that will not generate more heat than required for heating the gas to a temperature of between about 700° C. and about 750° C. at which level adequate oxygen flux is possible across an oxygen transport membrane. The partial oxidation reaction will typically convert the heavier, higher order hydrocarbons and result in the creation of some hydrogen and carbon monoxide in the process gas stream.

Stream 36 after having been so pretreated is fed into oxygen transport membrane reactor unit 14 for conversion of some of the methane and thereby to form stream 44. Stream 44 is fed into a known fired reformer unit 42' along with air and fuel to form crude syngas stream 46. Fired reformer unit 421 should be operated so that the temperature of crude syngas stream 46 at the outlet thereof is between about 900° C. and about 1000° C. to establish suitable equilibrium for complete methane conversion. As illustrated, stream 44 is preheated to a temperature of about 900 to 950° C. through indirect heat exchange with crude syngas stream 46 within heat exchanger 45.

As can be appreciated by those skilled in the art, partial oxidation reactors, adiabatic prereformers, and prereformers with heat addition can be interchangeably used in the pretreatment step, as can be autothermal reformers and fired reformers in the conversion of residual methane.

While the present invention has been discussed with reference to preferred embodiments, as will occur to those skilled in the art, numerous changes, additions, and omission can be made without departing from the spirit and scope of the present invention.

We claim:

1. A method of producing a syngas product stream comprising hydrogen and carbon monoxide, said method including:
    converting methane in a feed stream comprising methane into said hydrogen and carbon monoxide in at least two stages, thereby to form a crude syngas stream;
    the methane being converted at least in part by carbon dioxide or steam methane reforming in one of the at least two stages operated at a lower temperature than a subsequent of the at least two stages, positioned subsequent to the one of the at least two stages;
    the one of the at least two stages having at least one oxygen transport membrane to separate oxygen from an oxygen containing gas, thereby permeating oxygen from a cathode to an anode side thereof, and a reforming catalyst located at said anode side of the at least one oxygen transport membrane to promote the reforming of the methane, the reforming of the methane being thermally balanced through heat generated by oxidation of fuel species supported by the oxygen permeating through said at least one oxygen transport membrane; and
    removing water and at least part of the carbon dioxide from said crude syngas stream to form said syngas product stream.

2. A method of producing a crude syngas stream comprising hydrogen and carbon monoxide, said method including:
    converting methane in a feed stream comprising methane into said hydrogen and carbon monoxide in at least two stages, thereby to form said crude syngas stream;
    the methane being converted at least in part by carbon dioxide or steam methane reforming in one of the at least two stages operated at a lower temperature than a subsequent of the at least two stages, positioned subsequent to the one of the at least two stages;
    the one of the at least two stages having at least one oxygen transport membrane to separate oxygen from an oxygen containing gas, thereby permeating oxygen from a cathode to an anode side thereof, and a reforming catalyst located at said anode side of the at least one oxygen transport membrane to promote the reforming of the methane, the reforming of the methane being thermally balanced through heat generated by oxidation fuel species supported by the oxygen permeating through said at least one oxygen transport membrane.

3. The method of claim 1 or claim 2, further including converting methane in said feed into said hydrogen and carbon monoxide by partial oxidation of said methane prior to the reforming of the methane within an entrant section of said at least one oxygen transport membrane not containing said reforming catalyst.

4. The method of claim 3, further including converting higher order hydrocarbons within said feed into a portion of said methane to be converted into said hydrogen and carbon monoxide prior to the partial oxidation of the methane at a further temperature less than said lower temperature of said one of said at least two stages.

5. The method of claim 4, further including removing sulfur from said feed stream prior to the conversion of said higher order hydrocarbons.

6. The method of claim 1 or claim 2, in which said subsequent of said at least two stages is a fired reformer.

7. The method of claim 1 or claim 2, in which said subsequent of said at least two stages is an autothermal reformer.

8. The method of claim 4, wherein said higher order hydrocarbons are converted through catalytic partial oxidation.

9. The method of claim 4, wherein said higher order hydrocarbons are converted through carbon dioxide or steam methane reforming.

10. The method of claim 1 or claim 2, wherein part of said syngas product stream is recycled to form part of said feed stream.

11. The method of claim 1 or claim 2, wherein said lower temperature of the one of the at least two stages is in a range of between about 800° C. and about 850° C.

12. The method of claim 11, wherein:
    said one of the at least two stages is operated at a pressure range of between about 7 bar and about 30 bar; and
    said subsequent of said at least two stages is a fired reformer or an autothermal reformer operated such that an exhaust temperature of the crude syngas stream therefrom is at a temperature range of between about 950° C. and about 1100° C.

13. The method of claim 12 further including converting methane in said feed into said hydrogen and carbon monoxide by partial oxidation of said methane prior to the reforming of the methane within an entrant section of said at least one oxygen transport membrane not containing said reforming catalyst.

14. The method of claim 13, wherein the one of the two stages is operated such that the entrant section has a temperature no greater than about 750° C.

15. The method of claim 13, wherein the one of the two stages is operated such that the entrant section has a temperature within a range of between about 700° C. and about 750° C.

16. The method of claim 14, further including converting higher order hydrocarbons within said feed into a portion of said methane to be converted into said hydrogen and carbon monoxide prior to the partial oxidation of the methane at a further temperature less than said lower temperature of said one of said at least two stages.

17. The method of claim 16, wherein said higher order hydrocarbons are converted through catalytic partial oxidation at a temperature range of between about 400° C. and about 700° C.

18. The method of claim 16, wherein said higher order hydrocarbons are converted through carbon dioxide or steam methane reforming at a temperature range of between about 450° C. and about 550° C.

* * * * *